April 6, 1965   L. D. HARTLEY   3,176,967
BIN TUMBLER APPARATUS
Filed Nov. 29, 1961   3 Sheets-Sheet 1
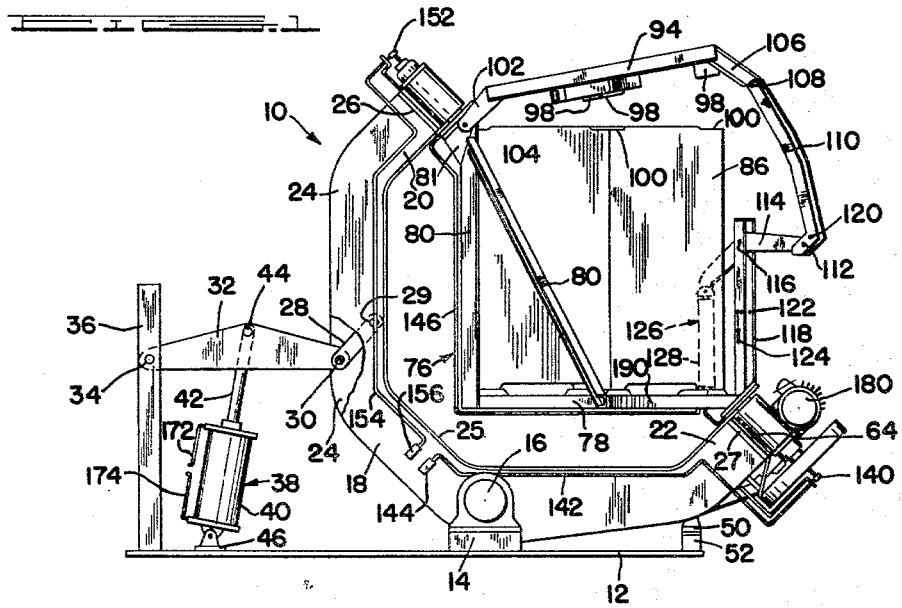
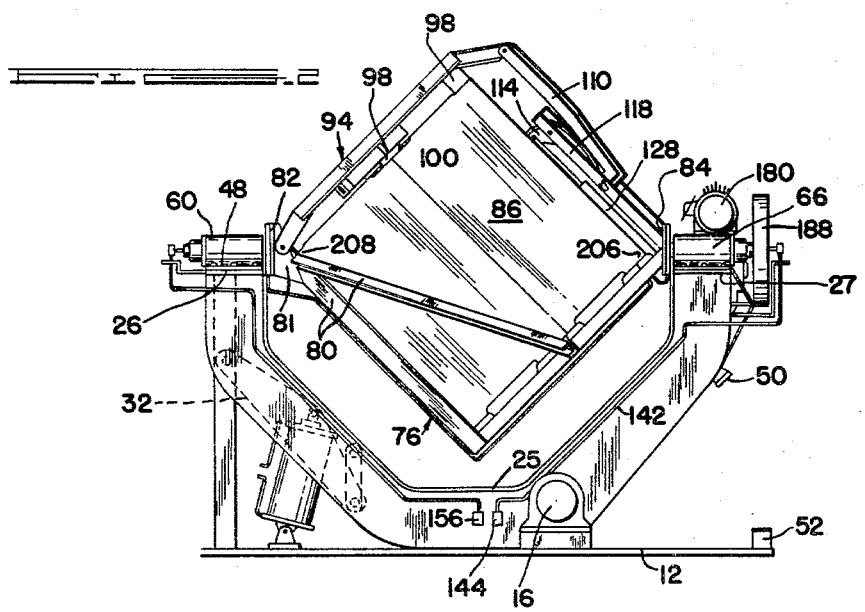
INVENTOR.
LARRY D. HARTLEY
BY
OLSEN AND STEPHENSON
ATTORNEYS

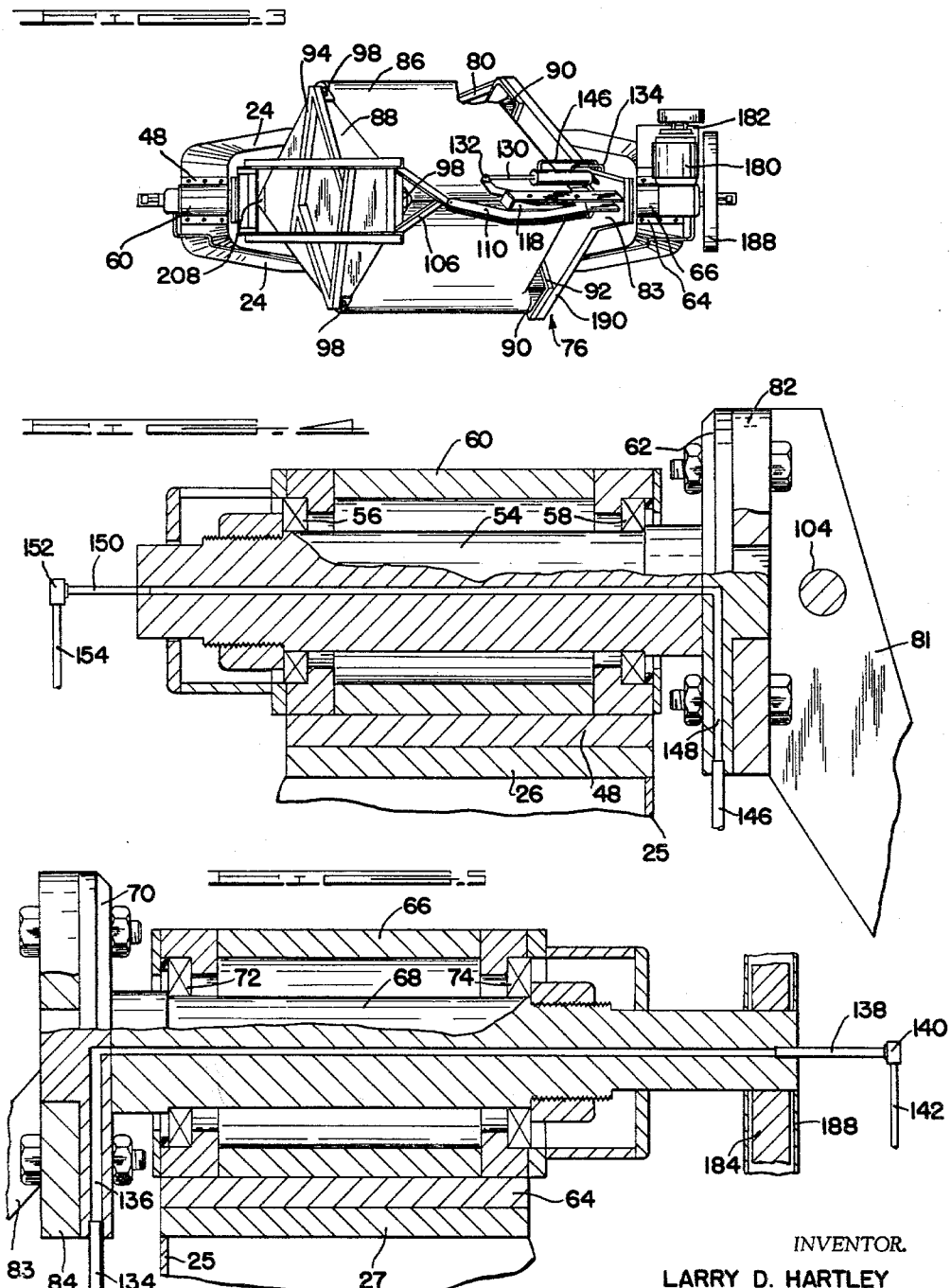

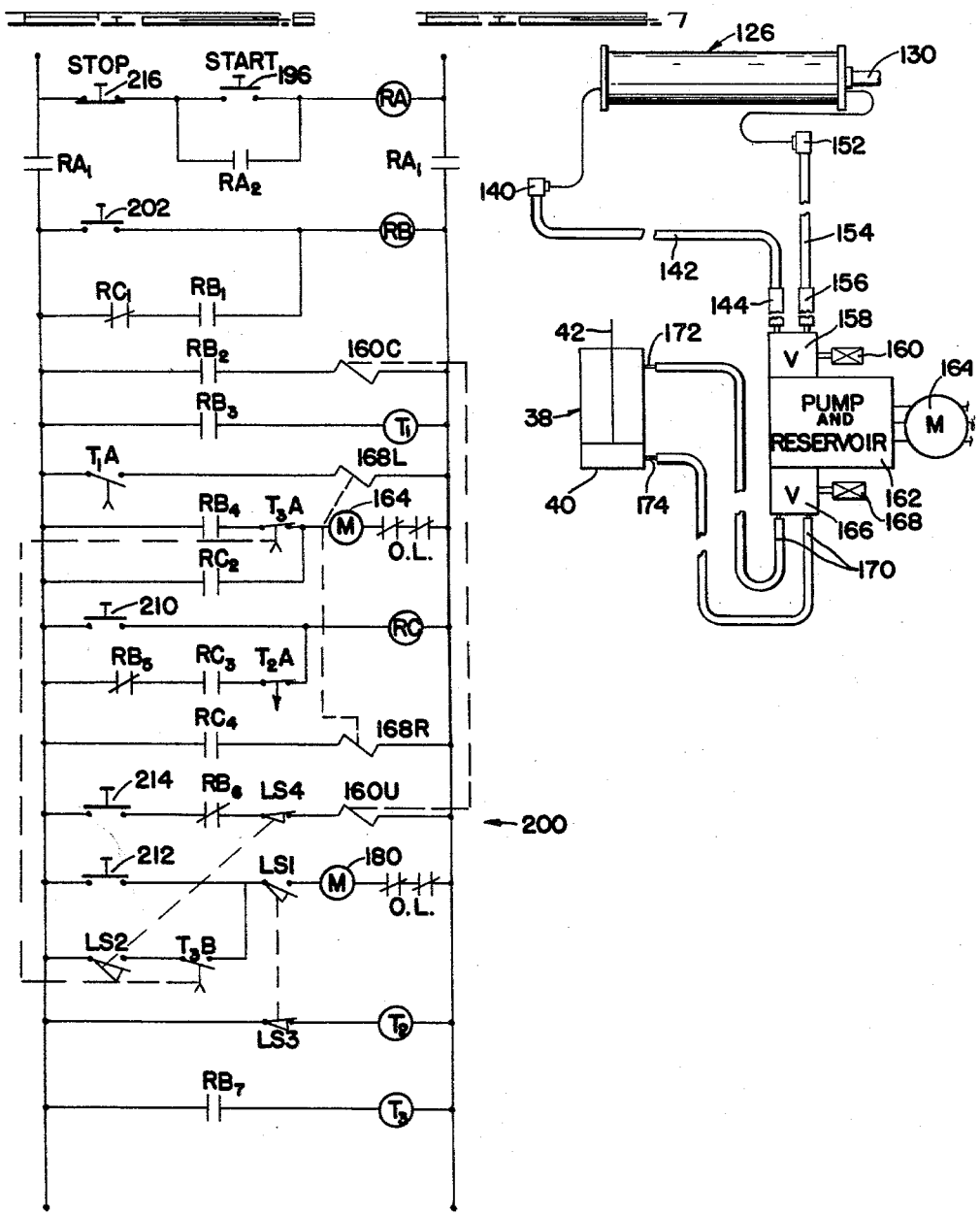

United States Patent Office 3,176,967
Patented Apr. 6, 1965

3,176,967
BIN TUMBLER APPARATUS
Larry D. Hartley, Beatrice, Nebr., assignor to Hoover Ball and Bearing Company, Ann Arbor, Mich., a corporation of Michigan
Filed Nov. 29, 1961, Ser. No. 155,778
14 Claims. (Cl. 259—89)

This invention relates generally to mixing apparatus and more particularly to apparatus for tumbling the contents of large bins in which bulk material is transported and stored.

Many industrial systems involving bulk materials require a mixing of some of these materials and the disadvantages involved in removing the materials from their separate bins or containers, proportioning the various materials, then loading these materials into a separate mixer, and then finally removing the mixed materials from the mixer are apparent. It is an object of this invention, therefore, to provide apparatus for manipulating large bins for bulk material so as to tumble the bin contents. A further object of this invention is to provide apparatus of this type which is movable between a bin loading position in which a bin can readily be loaded onto the apparatus and clamped in a fixed position thereon, and a tumbling position in which the bin is rotatable about an axis extending substantially through diagonally opposite corners of the bin to provide for an intimate mixing of the bin contents. Still a further object of this invention is to provide tumbling apparatus of the above described type which includes structure for readily clamping a bin in a desired position on the apparatus, moving the apparatus between bin loading and rotating positions, and control apparatus for moving the tumbling apparatus through a cycle of movement.

Further objects, features and advantages of this invention will become apparent from a consideration of the following description, the appended claims, and the accompanying drawing in which:

FIGURE 1 is a side elevational view of the tumbling apparatus of this invention, showing the apparatus in a bin loading and unloading position and showing a bin mounted on the apparatus and in a position to be clamped thereto;

FIGURE 2 is a side elevational view of the tumbling apparatus of this invention, illustrated similarly to FIG. 1, and showing the apparatus in a bin rotating position;

FIGURE 3 is a top view of the apparatus shown in FIG. 2;

FIGURE 4 is a detail view, partly in section, of one of the rotatable shafts on which the bin is supported in the apparatus of this invention;

FIGURE 5 is a detail view, partly in section, of the other bin supporting shaft in the apparatus of this invention;

FIGURE 6 is a circuit diagram illustrating the control circuit for the apparatus of this invention; and FIGURE 7 is a circuit diagram of the fluid system in the apparatus of this invention.

With reference to the drawing, the bin rotating apparatus of this invention, indicated generally at 10, is illustrated in FIG. 1 as including a base plate 12 provided with trunnions 14, only one of which is shown, which support a shaft 16. A generally U-shape cradle member 18 has a pair of substantially parallel leg portions 20 and 22 at its ends and is pivotally supported intermediate its ends on the shaft 16.

As shown in FIGS. 1, 2 and 3 the cradle member 18 is constructed of horizontally spaced side plates 24 connected by an elongated bent plate 25 and a pair of end plates 26 and 27. A link 28 is connected at one of its ends by a pin 29 to one of the side plates 24 at a position to one side of the shaft 16. At its opposite end, the link 28 is connected by a pin 30 to one end of a lever 32 which is connected at its opposite end by a pivot member 34 to an upright post 36 supported on the base 12. A fluid actuated cylinder assembly 38 which includes a cylinder 40 and a piston rod 42 has the outer end of its piston rod 42 connected by a pivot pin 44 to the lever 32 at a position between the pivots 30 and 34. The lower end of the cylinder 40 is pivotally mounted on a bracket 46 secured to the base 12.

When the piston rod 42 is extended, it moves the lever 32 and the link 28 so as to move the cradle 18 to the position illustrated in FIG. 1 which is hereinafter referred to as the bin loading or unloading position. The link 28 and the lever 32 cooperate to form a foldable lever assembly which transmits movement of the piston rod 42 into pivotal movement of the cradle 18. When the cylinder assembly 38 is actuated so as to retract the piston rod 42, the lever assembly is folded and the cradle 18 is moved in a counterclockwise direction about the shaft 16 to a stop position in which the end plate 26 engages the upper end of the post 36 to define a position of the cradle 18 shown in FIG. 2 in which the end plates 26 and 27 are substantially horizontally aligned, and which is hereinafter referred to as the bin rotating position. In response to extension of the piston rod 42, the lever assembly is unfolded so as to move the cradle 18 in a clockwise direction about the shaft 16 to the bin loading position shown in FIG. 1 which is defined by the engagement of a pair of stop members 50 and 52 on the cradle member 18 and the base member 12, respectively.

A first shaft member 54 (FIG. 4) is rotatably supported on bearings 56 and 58 carried by a bearing housing 60 which has a mounting plate 48 secured to the cradle end plate 26. The shaft 54 is provided at its inner end with a radially outwardly extending flange 62 for a purpose to appear presently. A bearing housing 66 (FIG. 5), for a second shaft 68 which is axially aligned with the shaft 54 and is likewise provided at its inner end with a radially outwardly extending flange 70, has a mounting plate 64 secured to the cradle end plate 27. The shaft 68 is supported on spaced bearings 72 and 74.

A bin supporting frame, indicated generally at 76 (FIGS. 1 and 3) includes a base plate 78, which is generally rectangular, and side braces 80, which in the horizontal position of the base plate shown in FIG. 1 extend upwardly from the base plate. The braces 80 are secured at their lower ends to the base plate 78 adjacent three of the base plate corners. The fourth corner of the base plate 78 is provided with an extension 83 which carries an attachment plate 84 that is secured to the flange 70 on the shaft 68 (FIG. 5). The upper ends of the side braces 80 are secured to gusset plates 81 which carry an attachment plate 82 that is secured to the flange 62 on the shaft 54 (FIG. 4).

It can thus be seen that the bin supporting frame 76 is secured to the coaxial shafts 54 and 68 for rotation about the axis of the shafts, and the frame 76 is located relative to this axis such that when a bin of predetermined size is mounted on the frame 76 the axis extends substantially through diagonally opposite top and bottom corners of the bin.

As shown in FIGS. 1, 2 and 3, the frame 76 is adapted to support a bin 86 having a top 88 and four bottom legs 90. The base plate 76 is provided with four receptacles 92 which are of a size and are arranged on the base plate 78 adjacent the corners thereof such that the supporting legs 90 for the bin 86 can be positioned therein.

When a bin 86 is supported on the base plate 78 as shown in FIG. 1, it can be clamped to the base 78 by a top 94 for the bin supporting frame 76. The top 94 is of an open framework construction and carries three depending legs 98 which are positioned so that they will engage three of the corner depressions 100 formed on the bin top 88 at positions such that a plurality of bins 86 can be stacked so that the legs 90 on one bin are supported on the depressions 100 on the lower bin. At one of its ends, the top 94 for the bin supporting frame 76 carries a pair of arms 102 which are pivotally supported on a shaft 104 mounted on the gusset plates 81 carried by the frame 76. This support of the frame top 94 on the shaft 104 provides for up and down pivotal movement of the top 94 relative to the base 78.

The opposite end of the top 94 is provided with a tongue 106 which is connected by a pivot pin 108 to one end of a link 110 which is connected at its opposite end by a pivot pin 112 to one end of a lever 114. A pivot member 116 extends transversely through an intermediate portion of the lever 114 and is supported on an upright post 118 secured to the base plate extension 83. As shown in FIG. 1, when the lever 114 is in a substantially horizontal position the link 110 is moved to a position in which the top 94 is positioned above the top of a bin 86 supported on the base plate 78. When the lever 114 is moved clockwise to a substantially upright position, as shown in FIGS. 2 and 3, the link 110 is moved downwardly to in turn move the top 94 downwardly to engage the legs 98 with three of the bin depressions 100 to firmly clamp the bin 86 against the base plate 78. No leg 98 is provided on the top 94 adjacent the arms 102 to insure clearance between the bin top and the frame top during loading and unloading of a bin onto the frame base 78. In this position of the link 110, openings 120 in the link are aligned with openings 122 in the post 118 so that a locking pin 124 can be inserted through the aligned openings 120 and 122 to lock the top 94 in its bin clamping position.

An upright fluid actuated cylinder assembly 126 includes an upright cylinder 128, which is secured at its lower end to the base plate 78 at a position adjacent the extension 83, and a piston rod 130 which is connected at its upper end by a pivot pin 132 to the opposite end of the lever 114. On retraction of the piston rod 130 into the cylinder 128, the lever 114 is moved to its substantially horizontal position shown in FIG. 1 in which the top 94 for the bin supporting frame 76 is moved to a position above the top of the bin 86 so that the bin 86 can be removed from its supported position on the frame 76 and a second bin can be loaded onto the frame 76. When the piston rod 130 is extended out of the cylinder 128, the lever 114 is movable to its substantially upright position in which the top 94 is moved to its bin clamping position.

The cylinder assembly 126 is of double acting type and is therefore connected at its lower end to one end of a fluid supply pipe 134. The pipe 134 (FIG. 5) is connected at its opposite end to one end of a passage 136 which extends radially inwardly of the flange 70 and then axially of the shaft 68. A pipe 138 is connected to the opposite end of the passage 136 and is also conected to a hollow swivel joint 140. The joint 140 is connected to one end of a pipe 142 which is mounted on the cradle 18 and is connected at its opposite end to a flexible hose 144. The top end of the cylinder 126 is connected to a pipe 146 which is mounted on the frame 76 and is connected at its opposite end to one end of a passage 148 which extends radially inwardly of the flange 62 and axially of the shaft 54. The opposite end of the passage 148 is connected to a pipe 150 which is connected to a hollow swivel joint 152. The joint 152 is in turn connected to one end of a pipe 154 which is mounted on the cradle 18 and is connected at its opposite end to a flexible hose 156. The hoses 144 and 156 are connected to a four way valve 158 (FIG. 7) controlled by a solenoid 160. The valve 158 is supplied with fluid from a pump and reservoir assembly 162 (FIG. 7) which is operated by a motor 164. A second four way valve 166, which communicates with the pump and reservoir assembly 162, is controlled by a solenoid 168 and is connected to flexible hoses 170 which are in turn connected to the lines 172 and 174 which communicate with the top and bottom ends, respectively, of the cylinder 40 for the cradle operating cylinder assembly 38. The valves 158 and 166, the pump and reservoir assembly 162, the motor 164 and the electrical control components hereinafter described may be conveniently mounted on a control panel (not shown) disposed adjacent the apparatus 10 and mounted, for example, on the post 36.

The bin supporting frame 76 is rotatable about the axis of the aligned shafts 54 and 68 in response to operation of an electric motor 180. The motor 180 drives a speed-reducer 182 which in turn drives the shaft 68 through a gear assembly, which includes a driven gear 184 (FIG. 5) secured to the shaft 68, enclosed in a guard housing 188.

In the operation of the apparatus 10, assume that the bin supporting frame 76 is in the position shown in FIG. 1 in which the top 94 therefor is in its upwardly moved position, and that no bin is supported on the base plate 78. The bin 86 which is to have the contents thereof tumbled is moved, by means of a fork-lift truck, or the like, horizontally across the unobstructed edge 190 of the base plate 78 to a position in which the bin legs 90 are vertically aligned with the leg receptacles 92 on the base plate 78. The bin 86 is then lowered to a position in which the bin legs 90 are supported on the base plate 78 and positioned within the receptacles 92.

A start switch 196 in a control circuit 200 for the apparatus 10 (FIG. 6) is closed to energize a control relay RA in series with the switch 196. On energizing of relay RA, the normally open contacts $RA_1$ and $RA_2$ therefor are closed to provide for a supply of current to the remainder of the circuit 200 and to lock in the relay RA so that the switch 196 can be released. A manual switch 202 is then closed to energize a control relay RB having normally open contacts $RB_1$ connected in series with normally closed contacts $RC_1$. As soon as the contacts $RB_1$ are closed, the switch 202 is released. Energizing of control relay RB also results in closing normally open contacts $RB_2$, $RB_3$, $RB_4$ and $RB_7$ and opening of normally closed contacts $RB_5$ and $RB_6$.

On closing of normally open contacts $RB_4$, the motor 164 is started to provide for a supply of fluid to the valve 158. Closing of contacts $RB_2$ results in energizing of the coil 160C for the solenoid 160 which moves the valve 158 to a position in which fluid is supplied through the pipe 142 to the lower end of the cylinder assembly 126 so as to extend the piston rod 130. Extension of the piston rod 130 for the cylinder assembly 126 results in moving the top 94 for the bin supporting frame 76 to its clamping position shown in FIG. 2. As soon as the top 94 has moved to a fully clamped position, the locking pin 124 is inserted in the aligned openings 120 and 122 in the link 110 and the post 118 to prevent accidental unclamping of the bin 86 in the frame 76.

Closing of the contacts $RB_3$ energizes time delay relay $T_1$, which is adjusted to close the normally open contacts $T_1A$ after a predetermined time period necessary for the top 94 to move to its clamping position. When time delay relay $T_1$ has timed out, contacts $T_1A$ close to energize the coil 168L for the solenoid 168 which actuates the valve 166 so as to provide for a supply of fluid through the line 172 to the upper end of the cylinder 40 for the cylinder assembly 38. Retraction of the piston rod 42 results in movement of the cradle 18 to its position shown in FIG. 2 in which the axis of the shafts 54 and 68 is substantially horizontal. Movement of the shaft axis to a horizontal position permits rotation of the frame 76 and bin 86 without the necessity for any thrust bearing or the like. As previously described, the axis of the shafts 54 and 68 extends substantially through diagonally opposite bottom and top corners 206 and 208, respectively, of the bin 86.

Closing of the contacts $RB_7$ effects an energization of the time delay relay $T_3$ which has normally closed contacts T₃A. After a predetermined time period, the relay T₃ times out and the contacts T₃A open so that the motor 164 for the pump and reservoir assembly 162 is stopped after the bin 86 has been moved to its position shown in FIG. 2. Also, when the relay T₃ times out, a set of normally open contacts T₃B close. The contacts T₃B are in series with the motor 180 which drives the shaft 68, the normally open contacts LS1 for a limit switch which is mounted on the bin supporting frame 76 at a position such that the contacts LS1 are closed when the top 94 is lowered to the clamping position, and a set of normally open contacts LS2 which are associated with a limit switch mounted on the cradle 18 so that they are closed when the cradle 18 is moved to its bin rotating position shown in FIG. 2. A set of normally closed contacts LS3 associated with contacts LS1 are opened when the contacts LS1 are closed, and a set of normally closed contacts LS4 associated with contacts LS2 are opened when the contacts LS2 are closed. Thus, since the top 94 is in its clamping position and cradle 18 is in its bin rotating position, the motor 180 is started as soon as the contacts T₃B are closed in response to timing out of the timer T₃.

During rotation of the frame 76, the cylinder assembly 126 rotates with the frame 76 and the fluid supply pipes 134, 138 and 146, 150 rotate relative to the fixed swivel joints 140 and 152, respectively, and the fixed pipes 142 and 154. This arrangement of the swivel joints and the axial passages 136 and 148 in the bearings 54 and 68 permits the use of the cylinder assembly 126 on the frame 76 in circuit with the cylinder assembly 38. The bin 86 continues to rotate about the axis extending through diagonally opposite corners thereof for as long as the operator deems necessary to effect an intimate mixing of the bin contents. Because the bin 86 is rotating about this diagonal axis, each particle in the bin is moved both horizontally and vertically during each revolution of the bin so that an intimate mixing of the bin contents is quickly effected.

When the bin 86 has been rotated for a time period sufficient for mixing, a manual switch 210 is closed to energize a relay RC which has normally closed contacts RC₁ in series with control relay RB. The closed contacts RC₁ open, thereby deenergizing relay RB so that the normally closed contacts RB₅ close. Since the normally open contacts RC₃ are now closed, the relay RC is maintained energized so that the switch 210 can be released. As soon as the relay RB is deenergized, the contacts RB₇ open to deenergize time delay relay T₃ so that the contacts T₃B open to stop the motor 180, and the contacts RB₃ open to deenergize relay T₁.

The contacts RC₂ close to start the pump motor 164, and contacts RC₄ close to energize the coil 168R for the solenoid 168 to move the valve 166 to a position in which fluid is supplied through the pipe 174 to the lower end of the cylinder 40 for the cylinder assembly 38 to thereby extend the piston rod 42. On extension of the piston rod 42, the link 28 and the lever 32 are unfolded to rotate the cradle 18 in a clockwise direction from its position shown in FIG. 2 to its bin unloading position shown in FIG. 1 in which the base plate 78 for the bin supporting frame 76 is substantially horizontal.

The contacts LS2 are now open and contacts LS4 are now closed since the cradle 18 is in its FIG. 1 position. However, since the top 94 is still in its clamping position, the contacts LS1 are still closed and the contacts LS3 are open. A jog switch 212 is then closed to start the motor 180 to rotate the bin supporting frame 76 to a position in which the unobstructed edge 190 of the base plate 78 is accessible to a fork-lift truck. When this has been accomplished, the lock pin 124 is removed, the switch 212 is released to stop the motor 180 and an "unclamp" switch 214 is closed to energize the solenoid winding 160U for the solenoid 160. On energization of the winding 160U, the valve 158 is moved to a position in which fluid is supplied through the pipe 146 to the upper end of the cylinder assembly 126 so as to rotate the lever 114 to the position shown in FIG. 1 in which the top 94 is moved upwardly into a clearance relation with the upper end of the bin 86. This results in closing of the limit switch LS3 to energize the time delay relay T₂. After a predetermined time delay, the normally closed contacts T₂A for the relay T₂ open to deenergize relay RC to thereby open contacts RC₂ to provide for shutting off of the motor 164. As soon as the bin 86 has been removed, the apparatus 10 is in condition for receiving a second bin 86 which may be moved through the same cycle of operation described above by sequentially closing the switches 196, 202, 210, 212 and 214. The cycle may be stopped at any time by opening a manual switch 216 in series with start switch 196.

From the above description it can be seen that this invention provides bin handling apparatus which has a bin supporting frame 76 mounted so that it can readily be moved to the position shown in FIG. 1 in which a bin 86 can easily be clamped to the frame. Once the bin is clamped to the frame 76, the cradle 18 is movable to a position in which the bin 86 is rotatable about a substantially horizontal axis extending substantially through diagonally opposite top and bottom corners of the bin to thereby provide for a quick and thorough mixing of the bin contents. This is accomplished without removing any material from the bin 86 which can then be transported to a subsequent work station or stored for later use. The bin 86 is readily clamped to the frame 76 by virtue of the provision of the pivotally mounted frame top 94 which is also readily movable to a position in which it does not interfere with removal of the bin 86 from the frame 76. The mounting of the frame 76 on the cradle 18 and the provision of the supporting shaft 16 for the cradle 18 along with the folding lever assembly which is operated by the cylinder assembly 38 provides for an efficient movement of the cradle 18 between its bin loading and bin rotating positions shown in FIGS. 1 and 2. The control circuit 200, in cooperation with the fluid circuit shown in FIG. 7, provides for a ready movement of the apparatus 10 through a predetermined cycle which insures the desired manipulation of the bin 86. The cylinder assemblies 38 and 126 may be either hydraulically or pneumatically actuated.

It is to be understood that the bin handling apparatus which is herein disclosed and described is presented for purposes of explanation and illustration, and is not intended to limit the scope of this invention, the scope of which is defined by the appended claims.

I claim:

1. In apparatus for tumbling the contents of a bin having a lower end and an upper end, a bin supporting frame having a base adapted to support the bottom end of said bin and a movable top adapted to engage the upper end of a bin supported on said base, a movable cradle, means on said cradle rotatably supporting said frame for rotation about an axis inclined with respect to said base, and means for moving said cradle between a bin loading position in which said base is substantially horizontal and a bin rotating position in which said axis is substantially horizontal.

2. In apparatus for tumbling the contents of a bin having a lower end and an upper end, a bin supporting frame having a base adapted to support the bottom end of said bin, means on said frame for maintaining said bin in a supported position thereon, a movable cradle, means on said cradle rotatably supporting said frame for rotation about an axis inclined with respect to said base, and means for moving said cradle between a bin loading position in which said base is substantially horizontal and a bin rotating position in which said axis is substantially horizontal.

3. In combination with a bin having a lower end and an upper end, a bin supporting frame having a generally horizontal base arranged in supporting engagement with said bin lower end, said frame having a top mounted for movement toward and away from said base and disposed in clamping engagement with the upper end of said bin, a cradle, means on said cradle rotatably supporting said frame for rotation about an axis inclined with respect to said base, and means mounting said cradle for movement to a position in which said base is inclined and said axis is horizontal.

4. The combination according to claim 3 in which said bin is of a generally rectangular shape in cross section and said axis extends substantially through diagonally opposite upper and lower corners thereof.

5. In apparatus for tumbling the contents of a rectangular bin of predetermined height having an upper end and a lower end provided with legs adjacent the corners thereof, a bin supporting frame having a base provided with bin leg receiving receptacles adapted to support the bottom end of said bin, a movable top for said frame movable toward and away from said base and adapted to engage the upper end of a bin supported on said base so as to maintain said bin in a fixed position on said base, a movable cradle, means on said cradle rotatably supporting said frame for rotation about an axis inclined with respect to said base and extended substantially through diagonally opposite top and bottom corners of said bin, and means for moving said cradle between a bin loading position in which said base is substantially horizontal and a bin rotating position in which said axis is substantially horizontal.

6. In apparatus for tumbling the contents of a rectangular bin of predetermined height and having supporting legs located substantially at the bottom corners thereof and a top, a bin supporting frame including a generally rectangular base having bin leg receiving portions at the corners thereof and a top movably mounted for movement toward and away from said base so that a bin is mountable on said base with its legs located at said receiving portions and said frame top is movable toward said base into clamping engagement with said bin top, and movable means rotatably supporting said frame for rotation about an axis inclined with respect to said base, means for moving said movable means between a first position in which said base is substantially horizontal and a second position in which said axis is substantially horizontal.

7. In apparatus for tumbling the contents of a bin, a generally U-shape cradle having spaced leg portions, axially aligned shaft means mounted on said leg portions, drive means mounted on said cradle and drivingly connected to one of said shaft means, a bin supporting frame having a generally rectangular base having corners and a top corner disposed in substantially diagonal alignment with one of said base corners, means mounting said frame on said shaft means so that said top corner and one base corner are disposed substantially in axial alignment with said shaft means, and a top for said bin supporting frame movably mounted thereon for movement toward and away from said base.

8. In apparatus for tumbling the contents of a bin, a generally U-shape cradle having spaced leg portions, axially aligned shaft means mounted on said leg portions, drive means mounted on said cradle and drivingly connected to one of said shaft means, a bin supporting frame having a base disposed at an angle to the axis of said shaft means, means mounting said frame on said shaft means for rotation therewith, means mounting said cradle for movement between a bin loading position in which said base is substantially horizontal and a bin rotating position in which said axis is substantially horizontal, a top for said bin supporting frame movably mounted thereon for movement toward said base into clamping engagement with a bin thereon, a double acting fluid actuated cylinder assembly mounted on said frame, means including a lever and link assembly connected to said cylinder assembly and said top for moving said top toward and away from said base, and fluid supply passage means for said cylinder assembly extended axially through said shaft means and connected to said cylinder assembly.

9. In apparatus for tumbling the contents of a bin, a generally U-shape cradle having spaced leg portions, axially aligned shaft means mounted on said leg portions, drive means mounted on said cradle and drivingly connected to one of said shaft means, a bin supporting frame having a base disposed at an angle to the axis of said shaft means, means mounting said frame on said shaft means for rotation therewith, shaft means mounting said cradle for rotatable movement between a bin loading position in which said base is substantially horizontal and a bin rotating position in which said axis is substantially horizontal, a top for said bin supporting frame movably mounted thereon for movement toward said base into clamping engagement with a bin thereon, a double acting fluid actuated cylinder assembly mounted on said frame, means including a lever and link assembly connected to said cylinder assembly and said top for moving said top toward and away from said base, fluid supply passage means for said cylinder assembly extended axially through said shaft means and connected to said cylinder assembly, a second fluid actuated cylinder assembly connected to said cradle and operable to move said cradle between said positions thereof, pump means for supplying fluid to said cylinder assemblies, solenoid valve means communicating with said pump means and operable to selectively communicate said cylinder assemblies with said pump means, and a control circuit for said apparatus connected to said solenoid valves.

10. In apparatus for tumbling the contents of a bin having a lower end and an upper end, a bin supporting frame having a base adapted to support the bottom end of said bin and a movable top adapted to engage the upper end of a bin supported on said base, first power means connected to said top and operable to move said top toward and away from said base, a movable cradle, means on said cradle rotatably supporting said frame for rotation about an axis inclined with respect to said base, motor means on said cradle for rotating said frame, second power means connected to said cradle for moving the cradle between a bin loading position in which said base is substantially horizontal and a bin tumbling position in which said axis is substantially horizontal, a control circuit connected to said motor and power means, said circuit having a plurality of switches therein operable in a predetermined sequence to provide for operation of said power and motor means so that said apparatus is moved through a cycle of operation in which:
 (a) said top is moved a predetermined distance toward said base,
 (b) said cradle is moved to said bin rotating position,
 (c) said frame is rotated,
 (d) said cradle is returned to said bin loading position, and
 (e) said top is moved away from said base.

11. In apparatus for tumbling the contents of a bin, a generally U-shape cradle having spaced leg portions, axially aligned shaft means rotatably mounted on said leg portions and extended toward each other so that their inner ends are in a spaced relation, drive means mounted on said cradle and drivingly connected to one of said shaft means, attachment means mounted on the inner ends of said shaft means, a bin supporting frame having a generally rectangular base having corners, brace means secured to and extending between said base and one of said attachment means, means securing one corner of said base to the other one of said attachment means, and means movably mounted on said frame for movement toward said base into engagement with a bin supported thereon.

12. In apparatus for tumbling the contents of a bin, a generally U-shape cradle having spaced leg portions, axially aligned shaft means mounted on said leg portions, drive means mounted on said cradle and drivingly connected to one of said shaft means, a bin supporting frame having a base disposed at an angle to the axis of said shaft means, means mounting said frame on said shaft means for rotation therewith, a substantially horizontal base plate, a shaft pivotally mounting said cradle on said base plate, means for moving of said cradle about said shaft between a bin loading position in which said base is substantially horizontal and a bin rotating position in which said axis is substantially horizontal, a top for said bin supporting frame movably mounted thereon for movement toward said base into clamping engagement with a bin thereon, and means mounted on said frame and connected to said top for moving said top toward and away from said base.

13. In apparatus for tumbling the contents of a bin, a generally U-shape cradle having spaced leg portions, axially aligned shaft means mounted on said leg portions, drive means mounted on said cradle and drivingly connected to one of said shaft means, a bin supporting frame having a base disposed at an angle to the axis of said shaft means, means mounting said frame on said shaft means for rotation therewith, a substantially horizontal base plate, a shaft pivotally mounting said cradle on said base plate for movement of said cradle between a bin loading position in which said base is substantially horizontal and a bin rotating position in which said axis is substantially horizontal, a top for said bin supporting frame movably mounted thereon for movement toward said base into clamping engagement with a bin thereon, fluid actuated means mounted on said frame and connected to said top for moving said top toward and away from said base, and fluid supply passage means for said fluid actuated means extended axially through said shaft means and connected to said fluid actuated means.

14. In apparatus for tumbling the contents of a bin, a generally U-shape cradle having spaced leg portions, axially aligned shaft means mounted on said leg portions, drive means mounted on said cradle and drivingly connected to one of said shaft means, a bin supporting frame having a base disposed at an angle to the axis of said shaft means, means mounting said frame on said shaft means for rotation therewith, a shaft member mounting said cradle for rotatable movement between a bin loading position in which said base is substantially horizontal and a bin rotating position in which said axis is substantially horizontal, a top for said bin supporting frame movably mounted thereon for movement toward said base into clamping engagement with a bin thereon, first fluid actuated means mounted on said frame and connected to said top for moving said top toward and away from said base, fluid supply passage means for said first fluid actuated means extended axially through said shaft means and connected to said first fluid actuated means, second fluid actuated means connected to said cradle and operable to move said cradle between said positions thereof, pump means for supplying fluid to said fluid actuated means, and valve means communicating with said pump means and operable to selectively communicate said first and second fluid actuated means with said pump means.

References Cited by the Examiner
UNITED STATES PATENTS

| Re. 21,973 | 12/41 | Jorgenson | 259—72 |
| 781,726 | 2/05 | Judd | 259—171 |
| 2,551,206 | 5/51 | Dickinson | 259—81 |

FOREIGN PATENTS

| 331,200 | 7/03 | France. |

CHARLES A. WILLMUTH, *Primary Examiner.*

LEO QUACKENBUSH, *Examiner.*